United States Patent [19]

Singer et al.

[11] Patent Number: 4,961,953
[45] Date of Patent: * Oct. 9, 1990

[54] FAT EMULATING PROTEIN PRODUCTS AND PROCESS

[75] Inventors: Norman S. Singer, Highland Park, Ill.; Joseph Latella, London; Yamamoto Shoji, Sherwood, both of Canada

[73] Assignee: John Labatt Limited/John Labatt Limitee, London, Canada

[*] Notice: The portion of the term of this patent subsequent to Mar. 29, 2005 has been disclaimed.

[21] Appl. No.: 367,261

[22] Filed: Jun. 16, 1989

Related U.S. Application Data

[63] Continuation of Ser. No. 127,955, Dec. 2, 1987, which is a continuation-in-part of Ser. No. 606,959, May 4, 1984, Pat. No. 4,734,287.

[51] Int. Cl.$^5$ ............................................. A23J 3/00
[52] U.S. Cl. ................................... 426/656; 426/520; 426/602; 426/614; 426/657; 426/658; 426/804; 530/363; 530/367; 530/370
[58] Field of Search ............... 426/656, 520, 602, 614, 426/657, 658, 804; 530/363, 367, 370

[56] References Cited

U.S. PATENT DOCUMENTS

| | | |
|---|---|---|
| 2,377,624 | 6/1945 | Gordon . |
| 2,566,477 | 9/1951 | Abrahamczik et al. . |
| 2,602,746 | 7/1952 | Meade . |
| 2,710,808 | 6/1955 | Peebles et al. . |
| 3,066,133 | 11/1962 | Pinckney . |
| 3,300,318 | 1/1967 | Szczensniak et al. . |
| 3,397,997 | 8/1968 | Japikse . |
| 3,507,663 | 4/1970 | Starook et al. . |
| 3,552,981 | 1/1971 | Luksas . |
| 3,594,192 | 7/1971 | Mullen et al. . |
| 3,615,661 | 10/1971 | Ellinger et al. . |
| 3,620,757 | 11/1971 | Chingas et al. . |
| 3,632,350 | 1/1972 | Rattlata . |
| 3,642,490 | 2/1972 | Hawley et al. . |
| 3,642,492 | 2/1972 | Arndt . |
| 3,642,493 | 2/1972 | Arndt . |
| 3,644,326 | 2/1972 | Pien . |
| 3,689,288 | 3/1972 | Duren . |
| 3,708,307 | 1/1973 | Lundstadt . |
| 3,723,407 | 3/1973 | Miller et al. . |
| 3,726,690 | 4/1973 | Schuppner et al. . |
| 3,737,326 | 6/1973 | Basso et al. . |
| 3,757,005 | 9/1973 | Kautz et al. . |
| 3,793,464 | 2/1974 | Rusch . |
| 3,798,339 | 3/1974 | Peng . |
| 3,800,052 | 3/1974 | Inagami et al. . |
| 3,829,592 | 8/1974 | Bratland . |
| 3,842,062 | 10/1974 | Eastman . |
| 3,843,828 | 10/1974 | Arndt . |
| 3,852,503 | 12/1974 | Magnino et al. . |
| 3,853,839 | 12/1974 | Magnino et al. . |
| 3,865,956 | 2/1975 | Fukushima et al. . |
| 3,873,751 | 3/1975 | Arndt . |

(List continued on next page.)

FOREIGN PATENT DOCUMENTS

| | | |
|---|---|---|
| 1313085 | 4/1973 | European Pat. Off. . |
| 0008242 | 2/1980 | European Pat. Off. . |
| 0076549 | 4/1983 | European Pat. Off. . |
| 7505092 | 9/1976 | France . |
| 8022390 | 7/1982 | France . |
| 2364491A1 | 6/1986 | German Democratic Rep. . |
| 1363783 | 8/1974 | United Kingdom . |
| 2063273 | 6/1981 | United Kingdom . |

OTHER PUBLICATIONS

An Article Entitled Fortyifying Soft Drinks With Cheese Whey Protein, by Holsinger et al., pp. 59, 60, 64, and 65 Feb., 1973.

Primary Examiner—Donald E. Czaja
Assistant Examiner—Evan Federman
Attorney, Agent, or Firm—Fisher, Christen & Sabol

[57] ABSTRACT

The present invention provides proteinaceous, water-dispersible macrocolloids which in a hydrated state have a substantially smooth, emulsion-like, organoleptic character. The macrocolloids may be produced from a variety of substantially soluble undenatured protein starting materials by controlled heat denaturation under high shear conditions.

25 Claims, 4 Drawing Sheets

U.S. PATENT DOCUMENTS

| | | |
|---|---|---|
| 3,891,777 | 6/1975 | Boyer . |
| 3,891,778 | 6/1975 | Boyer . |
| 3,892,873 | 7/1975 | Kolen et al. . |
| 3,899,605 | 8/1975 | Schaap . |
| 3,914,435 | 10/1975 | Maubois et al. . |
| 3,922,375 | 11/1975 | Dalan et al. . |
| 3,929,892 | 12/1975 | Hynes et al. . |
| 3,930,039 | 12/1975 | Kuiper . |
| 3,930,056 | 12/1975 | Feminella et al. . |
| 3,935,323 | 1/1976 | Feminella et al. . |
| 3,969,534 | 7/1976 | Pavey et al. . |
| 3,978,243 | 8/1976 | Pedersen . |
| 3,982,039 | 9/1976 | Scibelli et al. . |
| 4,007,283 | 2/1977 | Crisan et al. . |
| 4,018,752 | 4/1977 | Buhler et al. . |
| 4,029,825 | 6/1977 | Chang . |
| 4,031,261 | 6/1977 | Durst . |
| 4,031,267 | 6/1977 | Berry et al. . |
| 4,057,655 | 11/1977 | Okada et al. . |
| 4,058,510 | 11/1977 | Concilio-Nolan et al. . |
| 4,072,670 | 2/1978 | Goodnight, Jr. et al. . |
| 4,079,154 | 3/1978 | Yasumatsu . |
| 4,089,987 | 5/1978 | Chang et al. . |
| 4,091,116 | 5/1978 | Edwards et al. . |
| 4,103,037 | 7/1978 | Bodor et al. . |
| 4,103,038 | 7/1978 | Roberts . |
| 4,104,413 | 8/1978 | Wynn et al. . |
| 4,107,334 | 8/1978 | Jolly . |
| 4,113,716 | 9/1978 | Gomi et al. . |
| 4,125,630 | 11/1978 | Orthoefer . |
| 4,136,218 | 1/1979 | Gomi et al. . |
| 4,137,339 | 1/1979 | Kudo et al. . |
| 4,140,808 | 2/1979 | Jonson . |
| 4,143,174 | 3/1979 | Shah et al. . |
| 4,147,810 | 4/1979 | Kellor . |
| 4,169,160 | 9/1979 | Wingerd et al. . |
| 4,183,970 | 1/1980 | May et al. . |
| 4,188,411 | 2/1980 | Kuipers et al. . |
| 4,192,901 | 3/1980 | Yasumatsu et al. . |
| 4,194,018 | 3/1980 | Hodel et al. . |
| 4,194,019 | 3/1980 | Yasumatsu et al. . |
| 4,205,094 | 5/1980 | Baird et al. . |
| 4,209,503 | 6/1980 | Shah et al. . |
| 4,212,893 | 7/1980 | Takahata . |
| 4,217,370 | 9/1980 | Rawlings et al. . |
| 4,218,490 | 9/1980 | Phillips et al. . |
| 4,230,738 | 10/1980 | Shemer et al. . |
| 4,234,620 | 11/1980 | Howard et al. . |
| 4,244,983 | 1/1981 | Baker . |
| 4,247,565 | 1/1981 | Inagami et al. . |
| 4,248,895 | 2/1981 | Stroz et al. . |
| 4,251,562 | 2/1981 | LeGrand et al. . |
| 4,252,835 | 2/1981 | Maerker et al. . |
| 4,259,361 | 3/1981 | Procter . |
| 4,260,636 | 4/1981 | Yasumatsu et al. . |
| 4,265,924 | 5/1981 | Buhler et al. . |
| 4,267,100 | 5/1981 | Chang et al. . |
| 4,271,201 | 6/1981 | Stenne . |
| 4,275,084 | 6/1981 | Ohyabu et al. . |
| 4,278,597 | 7/1981 | Cho et al. . |
| 4,279,939 | 7/1981 | Cho . |
| 4,291,067 | 9/1981 | Buhler et al. . |
| 4,293,571 | 10/1981 | Olofsson et al. . |
| 4,305,964 | 12/1981 | Moran et al. . |
| 4,305,970 | 12/1981 | Moran et al. . |
| 4,307,118 | 12/1981 | Kajs . |
| 4,325,937 | 4/1982 | Remer . |
| 4,325,977 | 4/1982 | Remer . |
| 4,333,958 | 6/1982 | Egnell . |
| 4,340,612 | 7/1982 | Askman et al. . |
| 4,352,832 | 10/1982 | Wood et al. . |
| 4,362,761 | 12/1982 | Chang et al. . |
| 4,379,175 | 4/1983 | Baker . |
| 4,486,345 | 12/1984 | Callewaert . |
| 4,497,834 | 2/1985 | Barta . |
| 4,497,836 | 2/1985 | Maquardt et al. . |
| 4,500,454 | 2/1985 | Chang . |
| 4,515,825 | 5/1985 | Morar et al. . |

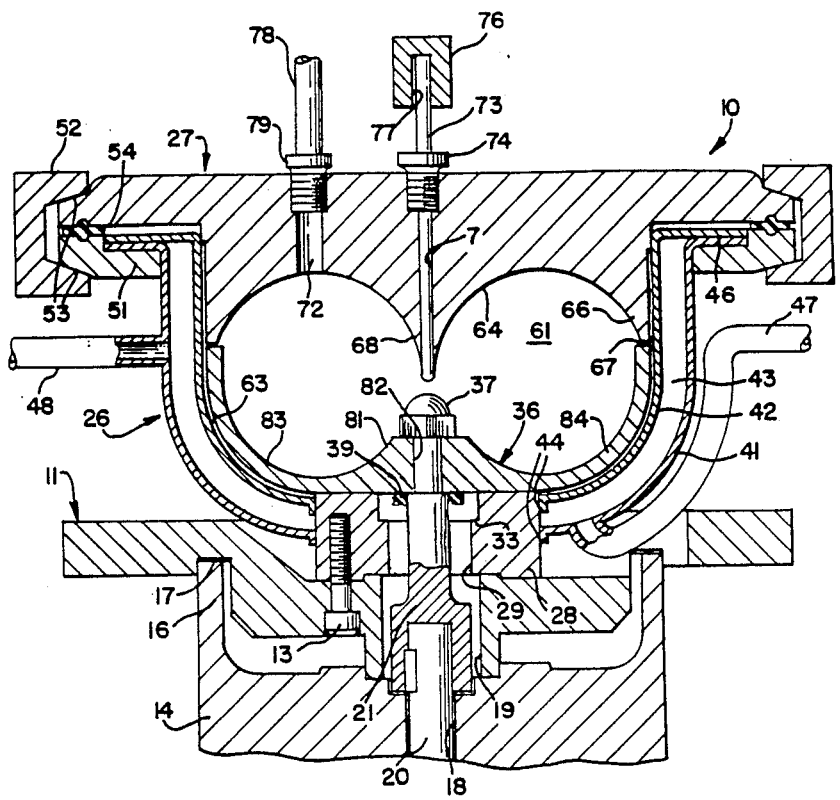
FIG-1a-
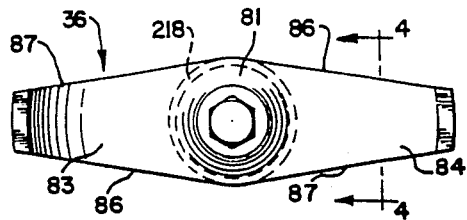
FIG-1b-

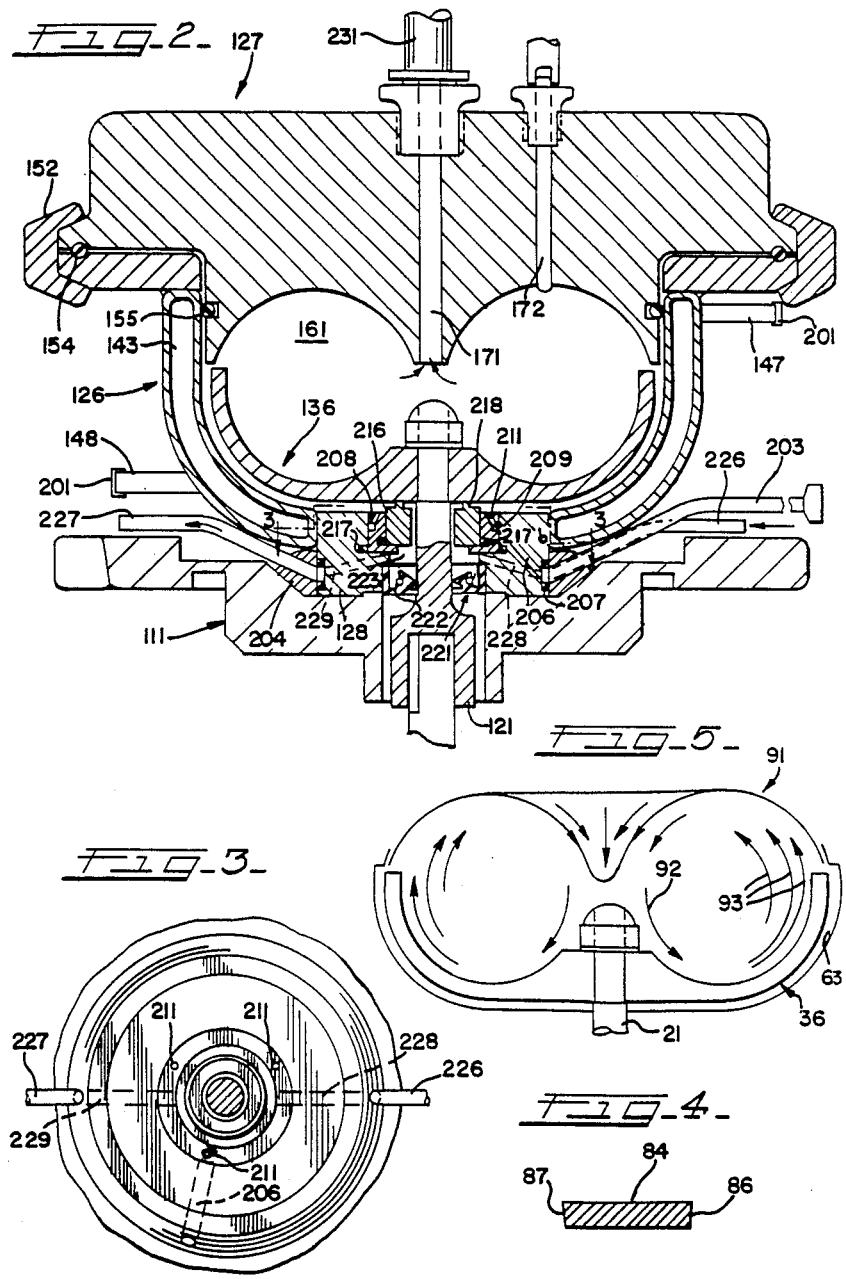

FAT EMULATING PROTEIN PRODUCTS AND PROCESS

This is a continuation application of Application Ser. No. 127,955, filed Dec. 2, 1987, which is a continuation-in-part of Application Ser. No. 606,959, filed May 4, 1984, now U.S. Pat. No. 4,734,287.

BACKGROUND

The present invention relates to replacements for fat, both per se as well as in the preparation of food products, in prophylactic and therapeutic weight loss treatments, and high protein therapies, and to edible food products of the type wherein fats, which are normally present in concentrations sufficient to make an organoleptic contribution, are replaced by proteinaceous materials which possess the smooth organoleptic character of oil in water emulsions.

Fat-rich foods enjoy considerable popularity and make up a significant proportion of the diet of many people. The undesirable impact from a nutritional viewpoint of such consumption is widely recognized, and numerous attempts have been made to address the problem.

Perhaps the most direct approach has been to simply reduce the amount of fat present in any given food. U.S. Pat. No. 3,892,873 exemplifies products in which multiple phase emulsions (e.g., oil/water/oil or water/oil/water) are employed to permit a reduction in the amount of fat present in certain fat-containing foods, without, it is claimed, unduly compromising the foods organoleptic character. In these products, the relationship of water and oil is modified in order to maximize the kinesthetic contribution of the oil and so permit a proportionate reduction of the amount of oil required in the food in order to manifest any given level of the organoleptic contribution associated with fats. While reducing the quantity of fat is highly desirable in as far as it goes, this approach is subject to very real limits on how far it can be carried. Even though the organoleptic contribution of the fat present in the food is optimized, any resulting food product nevertheless retains a substantial proportion of the fat necessarily commensurate with the desired mouth feel normally associated with the fats in such products. Therefore, although simple fat reduction has its advantages, this approach cannot be taken very far and does not hold the same potential benefits which are afforded by way of fat reduction through fat replacement.

The art is replete with proposals for the provision of fat-replacers in food products which are then described as "calorie reduced". As one example, U.S. Pat. No. 3,600,186 relates generally to low calorie products, comprising liquid polyol polyesters. U.S. Pat. No. 4,461,782 provides baked products comprising polyol fatty acids polyesters and microcrystalline cellulose as flour or starch replacements.

Sucrose polyesters are extolled as having the physical properties and appearance of normal fat, but at the same time are resistant to enzymatic hydrolysis in the gut, which renders them undigestible. According to an article which appeared in the Economist, Apr. 4, 1987, pages 87–88, however, sucrose polyesters have only been approved for use as protective coatings on fruit. Moreover, sucrose polyesters have an undesirable laxative effect which necessitates the collateral use of hydrogenated palm oil or the like when sucrose polyesters are used in large quantities. Worse still is the fact that sucrose polyesters interfere substantially with the body's absorption of fat soluble vitamins, especially vitamins A and E.

A more conventional approach to calorie reduced foods is exemplified by U.S. Pat. No. 4,143,163 which discloses smooth textured, high bulk food additive compositions made up of fibrous cellulose coated with soluble gums and polyhydric alcohols and provided as particles ranging in size between 20 and 40 microns. Rather than replace fats in the absolute sense, the fibrous cellulose material increases the relative proportion of the indigestible material in the food product. The use of other materials is intended to compensate in some degree for the poor mouth feel typically associated with high fibre foods.

One alternative to the problems associated with the often poor palatability of high fibre supplementation, involves the use of various aqueous gels as fat replacers. U.S. Pat. No. 4,305,964 relates to a fat replacer wherein gelled water beads based on aqueous dispersions of hydrated hydrocolloids are in turn dispersed in an oil-in-water emulsion. Notwithstanding whatever nutritional benefit that may be associated with the proportionately small amounts of hydrocolloid that is present in these gels, these compositions make no substantial direct nutritive contribution to a consumer's diet. U.S. Pat. No. 4,510,166, relates to a starch/water gels, that are taught as being useful as oil or fat replacers. The only nutritional benefit, apart from replacing oil or fat, that is afforded through this approach is the calorie value of the 10–50% of starch that these gels contain. In diets already rich in carbohydrates, this contribution, by itself, is of dubious value.

As stated, it is well known that, from a nutritional point of view, high fat levels in foods are not desirable, regardless of however optimized their organoleptic contribution may be. The dilution of fat through the use of fibre additives has some advantages, but gives no direct nutritional benefits to the consumer, although the consumption of a high fibre diet has been favorably associated with avoiding certain forms of intestinal disease. Water-gel-based fat replacers do not evidence any such additional benefits. The replacement of fats with sucrose polyesters also affords no direct nutritional benefit to the consumer, even though it apparently does have the advantage of sequestering cholesterol in the gut before the cholesterol can be absorbed into the body.

It would be most advantageous if a fat replacer additionally, could make a direct and desirable contribution to the consumer's nutritional requirements.

U.S. Pat. No. 4,308,294, makes some in-roads in this respect, by utilizing between 0.5 to 30% protein in a fat replacer comprising a whipped, hydrated protein/gum complex which is dispersed in a partially gelatinized, acidified starch-in-water phase. However, Column 2, lines 62 to 68 teaches that the desired oil-replacement properties are dependent on the organoleptic contribution of the swollen starch granules.

Under normal conditions, the healthy adult human's nitrogen equilibrium can be maintained with daily protein intake of 0.9 grams per kilogram of body weight per day. A fat replacer which is also a nutritional protein source could readily meet these requirements and provide both prophylactic and therapeutic benefits in respect of generalized protein deficiency conditions as well as of potential benefit in the treatment of obesity, arteriosclerosis and possibly a number of eating disorders as well.

There exists a need in the art for natural, nutritive materials which have a substantially smooth, emulsion-like, organoleptic character and for food products containing the same as at least a partial replacement for fats.

SUMMARY OF THE INVENTION

The present invention relates to proteinaceous, water-dispersible macrocolloid particles which in a hydrated state have a substantially smooth, oil-in-water emulsion-like, organoleptic character. Macrocolloid products according to the invention comprise a homogeneously sized and shaped population of substantially non-aggregated particles of denatured protein. The particles are characterized by being substantially spheroidal when viewed at about 800 power magnification under a standard light microscope. Such particles are characterized by having, in a dry state, a mean diameter particle size distribution ranging from about 0.1 microns to about 2.0 microns. In their preferred form, less than about 2 percent of the total number of the macrocolloid particles exceed 3.0 microns in diameter. Novel particulate denatured protein products of the invention, when dispersed in an aqueous medium, exhibit a mouth feel most aptly described as emulsion-like—approximating that associated with oil-in-water emulsions.

Suitable protein sources are animal, vegetable and microbial proteins including, but not limited to, egg and milk proteins, plant proteins (especially including oilseed proteins obtained from cotton, palm, rape, safflower, cocoa, sunflower, sesame, soy, peanut, and the like), and microbial proteins such as yeast proteins and the so-called "single cell" proteins. Preferred proteins include dairy whey protein (especially sweet dairy whey protein), and non-dairy-whey proteins such as bovine serum albumin, egg white albumin, and vegetable whey proteins (i.e., non-dairy whey protein) such as soy protein. Raw material sources providing soluble globular, non-fibrous proteins which have not previously been subjected to protein denaturing processing (e.g., during isolation) are presently most preferred.

Products of the present invention also include a proteinaceous, water-dispersible macrocolloid comprising substantially non-aggregated particles of denatured protein where substantially all of the total combined mass of said particles in a dry state is made up of particles having volumes of about $5 \times 10^{-4}$ cubic microns to about 5.5 cubic microns, and wherein the majority of the said particles are substantially spheroidal as viewed at 800 power magnification under a standard light microscope.

In order to effect the desired kinesthetic attributes associated with the present invention, (i.e., in order to give rise to a smooth, lubricious tactile impression) the majority of the particles of the present compositions preferably have a non-scabrous or substantially spheroidal topology. The term "substantially spheroidal" herein embraces shapes spanning the spectrum of spheres, and oblate or prolate spheroids. Compositions wherein spheres are the exclusive or predominant species are most preferred. The presence of other spheroidal shapes in compositions of the invention is acceptable, but compositions wherein such other spheroidal shapes predominate or are the exclusive species are less preferred. The presence of rodiform and filamentous particles, while tolerable, is less preferred. Spiculate particles are highly undesirable. Particles preferably have diameters (long axes in the case of non-spheres) which as measured in a dried state, fall in the low micron to near sub-micron range.

Protein denaturation herein follows from processes which are in general irreversible, and which result in alternations of the native, (i.e., undenatured) protein state in a manner which predisposes the protein's molecular accretion in the form of the above-mentioned particles. By way of example of such processes, there are disclosed herein processes whereby thermal denaturation of proteins amenable to such treatment is employed to effect the above-mentioned accretion.

In one aspect, processes of the invention comprise heating undenatured substantially soluble and heat coagulable proteins at heat denaturing temperatures in an aqueous solution at a pH less than the isoelectric point of said proteins, under shear conditions selected and carried out for a time sufficient to avoid the formation of any substantial amounts of fused particulate proteinaceous aggregates having diameters in excess of about 2 microns while also forming denatured proteinaceous macrocolloidal particles which are greater than about 0.1 micron in diameter.

In accordance with yet another aspect of the present invention, there is provided a process substantially as hereinabove described wherein the formation of any substantial amounts of fused particulate proteinaceous aggregates having volumes in excess of 5.5 cubic microns is avoided, while also forming denatured proteinaceous macrocolloidal particles which are greater than about $5 \times 10^{-4}$ cubic microns in volume.

Such processes according to the present invention are advantageously applied to aqueous solutions of heat coagulable protein, which are characterized by having a protein concentration between about 10% and about 20% (by weight). In general, protein raw material sources for practice of the invention should include in excess of about 80 percent soluble proteins and preferably in excess of about 90 percent soluble protein. Protein sources providing less than about 80 percent soluble protein are likely to include ab initio oversized particles and/or particle aggregates which can significantly detract from the desired organoleptic characteristics of products of the invention. The pH of the protein solutions is established below the midpoint of the isoelectric curve of the proteins in solution (i.e., the midpoint of the composite curve of the various isoelectric points of individual protein components), but not so low as to allow for substantial acidic hydrolysis of the protein. In general, establishing the pH at or near the midpoint of the isoelectric curve will tend to promote formation of larger sized particle populations while pH conditions substantially below the isoelectric curve midpoint will promote formation of particles with extremely small average diameters. Preferably, the pH of solutions is established at about 1 pH unit below the midpoint of the isoelectric curve of the protein source material. Where needed, adjustments in pH may readily be effected through use of organic or inorganic acids or bases.

If desired, protein solutions employed in the practice of the invention may be chemically or physically pre-treated to remove undesired non-protein or even proteinaceous constituents including peptides and amino acids. By way of example, dried sweet dairy whey protein concentrates (already treated by ultrafiltration to remove, e.g., substantial amounts of non-protein nitrogenous compounds and lactose) may be subjected to extraction processing for removal of fats and cholesterol as well as other components which might contribute to "off" flavors when the products of the invention are employed as fat replacements or substitutes in food products. As an alternative to ultrafiltration, dairy whey may be subjected to chromatographic purification to remove lactose, salts and most other non-protein components, leaving lactalbumins and lactoglobulins as the principal protein constituents.

Hydrated macrocolloid products of the invention are readily prepared from protein solutions through controlled application of heat and high shear conditions facilitative of controlled protein denaturation in a physical and chemical context allowing for the formation of non-aggregated proteinaceous particles of the desired size and shape. The particles formed during denaturation are generally spherical in shape and have average diameters in excess of about 0.1 microns. The formation of particles in excess of about 2 microns in diameter and/or formation of aggregates of small particles with aggregate diameters in excess of 2 microns is substantially avoided. Alternatively, the formation of particles or aggregates of particles having volumes in excess of 5.5 cubic microns is avoided while forming substantial numbers of particles having volumes of $5 \times 10^{-4}$ cubic microns or more. The protein denaturing temperatures employed and the duration of heat treatment will vary depending upon the particular proteinaceous starting material. In a like manner, the specific high shear conditions including the duration of shear applied to protein solutions will also vary. Illustratively, sweet dairy whey protein solutions having a pH of 3.5 to 5.0 may be treated according to the invention at temperatures ranging between 80°-130° C. for as little as 3 seconds to 15 minutes at 7,500 to 10,000 reciprocal seconds of shear.

The above are specific processing conditions which have been found in the production of many products according to the present invention. However, the specific shear rates suitable for any selected protein substrate can be readily determined by way of routine empirical trials, utilizing whatever processing apparatus is selected.

During denaturation processing according to the invention, undenatured proteins in solution interact to form insoluble coagulates and the controlled application of heat and high shear forces operate to insure formation of non-aggregated particles within the desired size range. Depending upon the specific properties of dissolved commercial protein materials and the properties of non-protein constituents in the solutions of these materials, the application of heat and high shear alone may not optimally allow for the avoidance of oversized particle aggregates. In such situation, it is within the scope of the invention that one or more materials such as lecithin, xanthan gum, malto-dextrins, carageenan, datem esters, alginates, and the like, ("aggregate blocking agents") be added to the protein solutions, most preferably prior to heat denaturation processing. Depending upon the aggregate blocking agent(s) selected, these materials may be added in concentrations ranging from as little as 0.1 to upwards of 10% by weight. Pre-hydration of the aggregate blocking agents has been found to facilitate their addition to protein solutions. If properly selected and treated, these aggregate blocking agents together with the un-coagulated proteins may further contribute to the lubricity of the system thereby enhancing the creamy impression.

In preferred protein solutions processed according to the invention there may also be present one or more polyhydroxy compounds, preferably mono-, di-, or tri-saccharides such as glucose, fructose, lactose and the like. These may be present as a component in the source materials employed to provide the soluble proteins (e.g., lactose (or the products of its enzymatic hydrolysis, glucose and galactose if an optional lactase treatment is employed) present in dried whey protein concentrates) or may constitute additives to the protein solutions. The relative concentration of polyhydroxy compound in various protein solutions is subject to wide variance. Certain proteinaceous starting materials (e.g., dairy whey protein purified by column chromatography) which include essentially no sugars or other polyhydroxy compounds can rather readily be processed to yield macrocolloids of the invention, but somewhat improved products result attending the incorporation of lactose, particularly when an aggregate blocking agent is to be added to the protein solution. Other solutions of proteinaceous starting materials (e.g., egg white and bovine serum albumin) greatly benefit from addition of, e.g., lactose, to secure optimal efficiencies in production of products of the invention. Thus, from 0 to about 100%, by weight of the protein, or more polyhydroxy compound (preferably sugars and most preferably reducing sugars such as lactose) may be added to protein solutions processed according to the invention.

Protein raw materials useful in the present process including animal, vegetable and microbial proteins selected from the group consisting of albumins; globulins;

glutelins, heat coagulable, soluble conjugated proteins; heat coagulable, soluble derived proteins; and, mixtures thereof.

Controlled denaturation processes of the invention essentially involves "removal" of protein molecules from solution by the association of numerous of these protein molecules with each other to form a protein coagulum which is rendered insoluble through application of heat. Further composition and process controls are instituted to prevent the growth of the size of such coagula beyond the desired range. Because salts can substantially affect the solubility and tendency toward coagulation of proteins in aqueous solution, it is within the contemplation of the present invention that routine adjustments be made in the concentration of salts in solutions which are to be subjected to heat and high shear conditions.

Optional ingredients of protein solutions employed in practice of the invention include colorants, flavors, stabilizers, preservatives, and the like in quantities sufficient to provide desired characteristics for the products.

The present invention also provides edible compositions or food products in which fats normally present in the product have been replaced by a hydrated proteinaceous materials according to the invention. Such foods include reduced calorie products such as salad dressings, mayonnaise-type dressings and spreads and ice cream-like frozen desserts. Further reductions in calorie content may also be produced with the materials of the present invention in conjunction with high-potency sweeteners such as aspartame, alitame, acesulfame K and sucralose. Compositions of the present invention may also be supplemented with vitamins and/or minerals.

BRIEF DESCRIPTION OF THE DRAWINGS

The invention will be better understood from the following detailed description taken in conjunction with the accompanying figures of the drawings, wherein:

FIG. 1a is a sectional view showing an embodiment of processor apparatus designed for batch operation in practice of the invention;

FIG. 1b is a plan view of a blade of the processor of FIG. 1a;

FIG. 2 is a view similar to FIG. 1 but showing apparatus designed for continuous flow operation;

FIG. 3 is a sectional view taken on the line 3—3 of FIG. 2;

FIG. 4 is a sectional view taken on the line 4—4 of FIG. 1b, and

FIG. 5 is a view illustrating the operation of the processor;

DETAILED DESCRIPTION OF THE INVENTION

Figure 6:
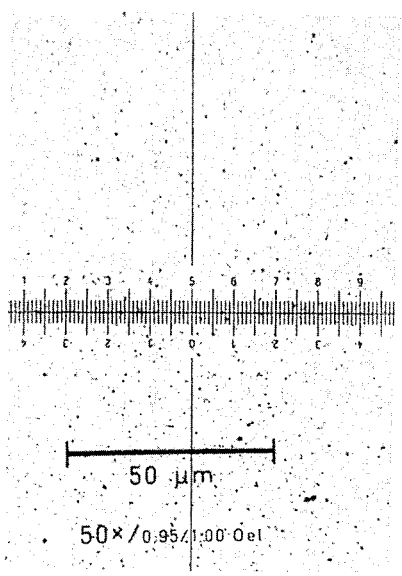
FIG. 6 is a photomicrographic view at 1000×magnification of a sample of whey protein macrocolloid according to the invention.
Figure 7:
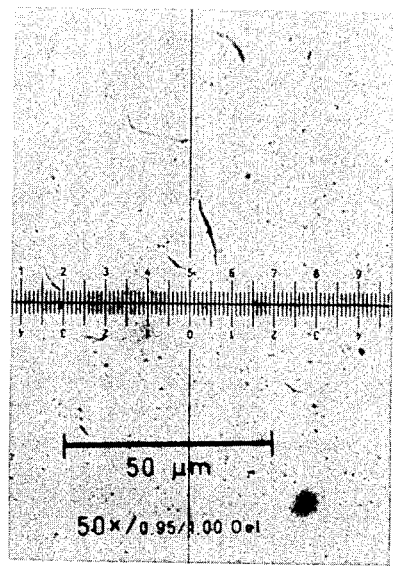
FIG. 7 is a photomicrographic view at 1000×magnification of a sample of bovine serum albumin macrocolloid according to the invention.
Figure 8:
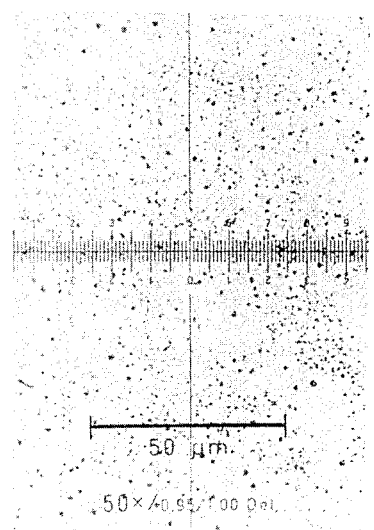
FIG. 8 is a photomicrographic view at 1000×magnification of a sample of egg white albumin macrocolloid according to the invention.
Figure 9:
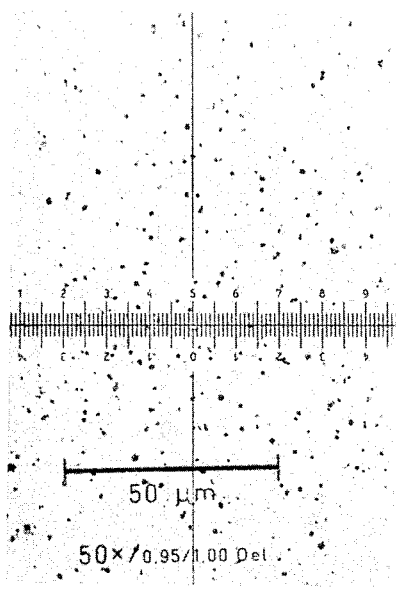
FIG. 9 is a photomicrographic view at 1000×magnification of soy protein macrocolloid according to the invention.

It has been determined according to the present invention that proteinaceous water-dispersible macrocolloids which in a hydrated state have a substantially smooth, emulsion-like, organoleptic character may be produced from a variety of protein materials. The proteinaceous, water-dispersible macrocolloids are comprised of substantially non-aggregated particles of denatured protein which are characterized by having in a dry state a mean diameter particle size distribution ranging from about 0.1 microns to about 2.0 microns, with less than about 2 percent of the total number of particles exceeding 3.0 microns in diameter. The particles are further characterized by being generally spheroidal as viewed at about 800 power magnification under a standard light microscope.

The macrocolloid materials may be produced by controlled denaturation from a wide variety of proteinaceous starting materials which, before processing, are substantially soluble in water and are substantially undenatured.

Aqueous dispersions of the macrocolloids of the present invention are characterized by a substantially smooth, emulsion-like, organoleptic character and may be used according to the present invention as high protein-low calorie fat replacers. Also provided by the invention are foods which include as ingredients or are based on the macrocolloids.

In respect to the use of the terms "mouth feel" and "organoleptic character" herein, it will be appreciated that such relates generally to a group of tactile, feeling sensations which, while common to the body as a whole, are particularly acutely perceived in the lingual, bucal and esophageal mucosal membranes. More precisely, the terms "mouth feel" and "organoleptic character" as used herein are in reference to one of the above-mentioned group of sensations and in particular, to those sensations associated with the tactile perception of fineness, coarseness and greasiness. This tactile impression is generally appreciated in the mouth proper wherein subtle differences between various foods are most readily perceived.

Thus, the novel protein products of the present invention, when dispersed in an aqueous medium, exhibit a mouth feel and organoleptic character most aptly described as emulsion-like. Obviously, the degree of hydration of the protein affects its rheological properties, and hence the manner in which the materials are perceived. The mouth feel of these products desirably and closely approximates that associated with fat-in-water emulsions.

The pseudo-emulsion character of the novel protein products of the present invention is manifest in gravitationally stable macrocolloidal dispersions of the heat denatured coagulated protein particles, which range in size from about 0.1 to about 2.0 microns in diameter. Such dispersions approximate the visual and organoleptic impressions normally associated with oil-in-water emulsions such as (by ascending order of the concentration of the novel materials in some corresponding products obtainable through the practice of the present invention) coffee-whiteners, pourable salad dressings, spoonable salad dressings, spreads and icings.

It will be appreciated that the term "solution" is often used in the protein art as a synonym for what is in fact a true colloidal dispersion of undenatured proteins. Such undenatured protein particles have sizes of about 0.001 to about 0.01 microns such that the stability of colloidal dispersions of these are dependent upon the net electrical charges on the protein molecules and, particularly at pHs near the isoelectric point thereof, on the affinity of these proteins for water molecules. Thus, such undenatured proteins properly fall within the ambit of the smaller ranges of particles studied in colloid chemistry, as defined in the *Condensed Chemical Dictionary*, 9th Edition, page 222. In contradistinction thereto, the denatured protein particles of the present invention range in size from about 0.1 to about 2.0 microns, and hence include particles nearer and above the upper limit of the size range set out in the above-mentioned definition. Notwithstanding the heat denaturation processing of the proteins of the present invention, the general colloidal character thereof (i.e., the stability of dispersions of such particles in an aqueous medium) is not lost. Accordingly, novel protein dispersions within the context of the present invention resist protein sedimentation from neutralized aqueous suspensions at forces as high as 10,000 gravities (at a pH about 6.5 to 7.0). Hence, the term "macrocolloidal dispersions" is used herein for the purpose of distinguishing between "solutions" of undenatured proteins (i.e., "true colloid dispersions") and those based on the novel proteins of the present invention (hereinafter "macrocolloidal dispersions"). Similarly, the denatured coagulated proteins of the present invention is hereinafter referred to as a macrocolloid to be distinguished from a true colloid which pursuant to the above-cited dictionary definition means a substance wherein the particle sizes are not greater than 1 micron. This distinction reflects the relatively larger size which is typical of the particles of the denatured coagulated protein products of the present invention.

The particularly desired organoleptic qualities of the macrocolloid materials according to the present invention are particularly dependent upon the sizes and shapes of the macrocolloid particles.

Specifically, it has also been found that dispersions of larger, denatured protein coagulates (i.e., with diameters greater than about 3 microns when dried) impart an undesirable chalky mouth feel to foods so supplemented. This chalkiness can be identified as being a less coarse variant of the gritty mouth feel of known heat denatured proteins (about 15-175 microns). It appears that a sharply defined perceptual threshold is crossed as the number of particles of protein coagulate with diameters larger than about 2 to 3 microns in their largest dimension increases.

Fibrous particles having lengths generally greater than about 5 microns and diameters generally less than about 1 micron produce pastes which are smooth but dilatant (as more force is applied between the tongue and palate, an increasing sense of solid substance is perceived). As fibers become shorter approaching spherical shapes, this character decreases.

The shapes of particles are also important as particles which are generally spheroidal tend to produce a smoother, more emulsion-like organoleptic sensation. Where increased proportions of macrocolloid particles are generally spheroidal or where the macrocolloid particles are more perfectly spheroidal, it may occur that somewhat greater proportions of particles may have diameters greater than about 2 microns without detriment to the organoleptic character of the macrocolloid mixture. As alluded to hereinbefore, however, rod-like particles with diameters greater than about one micron tend to produce a chalky to powdery mouth feel.

Particle sizes approaching 0.1 microns contribute a greasy mouth feel which may be objectionable if it is perceived as the dominant tactile characteristic in a product which is intended to simulates an oil in water emulsion product. Where it is desired to produce a product wherein a greasy mouth feel is attractive, such as a butter-like spread, such particle size would be useful. Because the perceived transition between an emulsion-like mouth feel and a greasy mouth feel appears to be much more gradual than is the transition between the former and the chalky mouth feel, greater proportions of particles on the order of 0.1 microns in diameter are acceptable in macrocolloids of the present invention. Thus, provided that the mean particle size is not less than 0.1 microns, the emulsion-like character is dominant, notwithstanding that the distribution itself may include a substantial proportion of individual particles having diameters smaller than 0.1 microns.

Proteins useful in the present process include those from such varied and diverse sources as vegetable whey from oil seeds, mammalian lactations, blood serum and avian ova.

Preferably, the present process relates to proteins which are globular proteins when in their native state.

From the perspective of traditional protein classification, the present process applies to proteins that are soluble in aqueous solvent systems and are selected from amongst the simple, conjugated and derived proteins. Suitable simple proteins include: albumins, globulins and glutelins. Suitable conjugated proteins include: nucleoproteins; glycoproteins and muccoproteins, (also known collectively as glucoproteins); phosphoproteins (sometimes themselves classed as simple proteins); chromoproteins; lecithoproteins; and, lipoproteins. Heat-coagulable derived proteins are also suitable.

Simple proteins not useful in the present process are the albuminoids (a.k.a. scleroproteins) such as elastins, keratins, collagens and fibroins, all of which are insoluble in their native states. Protamines (a.k.a. protamins) and histones are not heat coagulable and are therefore unsuitable as raw materials for the present heat denaturing process.

Conjugated proteins which are both soluble and heat coagulable are useful in the present process.

Similarly, derived proteins (i.e., the products of various proteoclastic or denaturing processes) which, notwithstanding their derivation, remain both soluble and heat coagulable, are also useful as raw materials in the present process, provided, of course, that they are not, by virtue of their derivation, rendered, ab initio, incompatible with the manifestation of the desired, organoleptic properties in the final product of the present process. In general, however, many proteins, metaproteins (a.k.a. infraproteins), coagulated proteins, proteoses, peptones and peptides (a.k.a. polypeptides) lack one or both of these prerequisite characteristics.

Heat coagulability, in accordance with the practice of the present process, takes into account any particular protein's innate capacity to form insoluble masses under heat/shear conditions. The purity of the protein sample, and the degree of denaturation or incipient latent denaturation of the sample, all bear directly or indirectly on the suitability of the protein for use as a raw material in the present process.

For the purposes of the present process, a protein is "soluble" if it is about 80% or more soluble in accordance with the criteria set forth herein below. A solubility of greater than 90% is preferred.

Solubility is measured, under non-denaturing conditions, using the solvent system that will be used in processing. In light of the present disclosure, a man skilled in the art will have no difficulty in selecting a suitable solvent system, having regard for the solubility characteristics of the particular protein to be processed, and including the corresponding pH and temperature parameters called for in the process. In general, solubility is influenced by a number of intrinsic and extrinsic factors. Of primary importance in solvent selection are pH, salt concentration, temperature and the dielectric constant of the solvent. By way of example, while albumins are soluble in water, globulins are insoluble in water but soluble in salt solutions. To a lesser extent, protein purity, in terms of both other proteins and non-protein constituents, also influences solubility. Accordingly, while an impure sample may not exhibit the prerequisite solubility, a purer sample may. Note, however, that the purer any given sample of a single species of protein is, the more critical close adherence to the selected processing parameters becomes.

The solubility of the protein is measured by dispersing 10 grams of protein in 190 grams of the selected solvent system in a Waring blender for one or two minutes. The resulting dispersion is divided into two portions. One such portion is centrifuged for 25 minutes in a Beckman L8-70 centrifuge using an SW-55 rotor (Beckman, Palo Alto, Calif.) at 11,000 r.p.m. (17,000 g) and 22° C. The supernatant of the centrifuged portion is then collected. Protein contents of both the uncentrifuged portion (Solution No. 1) and the supernatant of the centrifuged portion (Solution No. 2) are determined based on nitrogen analysis using a Carlo Erba Nitrogen analyzer (Model 1500, Milan, Italy) and the percent solubility is thus calculated according to the formula:

$$\% \text{ Soluble Protein} = \frac{\% \text{ Protein in Solution No. 2}}{\% \text{ Protein in Solution No. 1}} \times 100$$

While solutions may be centrifuged at higher rates (up to 50,000 rpm and 330,000 g) with the result that higher percentages of materials are collected, it has been found that protein materials which are greater than about 85% soluble according to the recited test methodology at 17,000 g, are generally sufficiently stable in dispersion, or "soluble," for purposes of the present invention.

The preferred protein for a particular use may vary according to considerations of availability, expense, and flavor associated with the protein as well as the nature of impurities in and other components of the protein source. Preferred proteins of the present invention include globular proteins such as bovine serum albumin, egg white albumin and soy protein, with dairy whey protein being particularly preferred. Sources of proteins which may be subject to treatment according to the present invention often comprise various impurities. It is desirable therefore that where proteins useful with the invention are naturally associated with insoluble components, such components be smaller than the 3.0 micron limit or be removable prior to processing or rendered smaller than that limit in the course of processing.

Once a specific protein source is selected, the protein solution is treated for relatively short times to relatively specific temperature, shear and pH conditions. Depending on the protein, the presence of specified amounts of polyhydroxy compounds (e.g., sugars), aggregate blocking agents and other optional ingredients will assist in optimizing the yield of desired products. The macrocolloids are produced according to a controlled heat denaturation process during which high shear is utilized to prevent the formation of any significant amounts of large particle size protein aggregates. The denaturation process is carried out at a pH less than the midpoint of the isoelectric curve of the selected protein and preferably at a pH about 1 pH unit below the midpoint of the isoelectric curve. The process may be carried out at lower pHs with the requirement that the processing pH should not be so low as to result in acid degradation of the protein and the limitation that the pH should generally not be less than about 3.

The precise temperatures and shear conditions applied in macrocolloid preparation are routinely selected and extend out for times sufficient to form denatured proteinaceous macrocolloidal particles which are greater than about 0.1 microns in diameter while avoiding the formation of any substantial amounts of fused particulate proteinaceous aggregates in excess of about 2 microns. Preferred shear conditions for processing a given protein solution are best determined by using "oversize" particle testing.

Particle size testing provides a measure of organoleptic quality of the products of the present invention.

One of the simplest and most rapid of the techniques available to a man skilled in the art involves the preparation of an optical slide in a manner which is analogous to the preparation of clinical blood smears. Pursuant to this method, an appropriate dilution of the dispersed macrocolloid is first prepared and adjusted to a pH preferably in the range of 6.5 to 7. High speed magnetic stirring, ultrasonication or homogenization is then applied to fully disperse any weak associations there might be between the individual macrocolloid particles. A small amount (e.g., 8 microliters) of the diluted, neutralized dispersion is then applied to a glass microscope slide of the variety often used in biological studies, and allowed to dry. The sample is viewed under known magnification using "ruled" occular eyepieces with well-known methods. The dispersed macrocolloidal particles of the sample was then visually compared with the reticules on the occular to provide a good estimation of the statistical incidence of oversize or aggregated particles within the population as a whole.

An alternative means for analyzing particle size distributions involves the use of an image analyzing computer, for example, a QUANTIMET ™ 720 available from Cambridge Institute, U.K.

Another means involves the use of the MICROTRAC ™ particle size analyzer. The general aspects of this technique are described in an article entitled "Particle Size Analysis and Characterization Using Laser Light Scattering Applications" by J. W. Stitley, et al. in *Food Product Development,* December, 1976.

As will be apparent to a man skilled in the art in light of the instant disclosure, sedimentation techniques may also be utilized for the purpose of rendering particle size determinations. It will be appreciated, however, that gravimetric techniques must take into account the protective colloid effects of, for example, whatever processing aids may have been used during the above-described heat denaturation treatment. One example of a gravimetric determination of the percent "oversized" protein aggregate is summarized hereinbelow:

1. A 5% weight by weight dispersion of the macrocolloid of the present invention is prepared and neutralized to a pH of between 6.5 and 7;

2. A high fructose corn syrup having a specific gravity of 1.351, a pH of 3.3, a total nitrogen of 0.006% and a solids concentration of about 71% is added in a 1 to 4 weight by weight ratio to the neutralized 5% macrocolloid dispersion;

3. The mixture is then homogenized to disperse loose associations between the macrocolloid particles;

4. The mixture is then centrifuged at 478 gravities for 20 minutes at about 15 degrees Centigrade. The oversized protein aggregates, i.e., particles having a diameter substantially greater than 2 microns, can be expressed as a percentage of the weight of the protein contained in the centrifuged pellet divided by the weight of the protein contained in the macrocolloidal dispersion prior to centrifugation.

These tests are applicable in respect of both the macrocolloidal dispersions of the present invention and the protein materials useful as raw materials in the production of said macrocolloids. As will be readily apparent to a man skilled in the art, capacitance based particle size analysis equipment such as, for example, the well know Coulter-Counter ™ analyzers will not be suited to the present application, having regard to the charged nature of the macrocolloid particles at certain pH's.

In accordance with the preferred processing conditions, however, the aqueous protein solution is subjected to high temperatures for a very short time at shear rates of 7,500 to 10,000 reciprocal seconds or greater. For a one gallon Waring blender drive equipped with a miniaturized (e.g., 1 liter capacity) "Henschel" mixer, for example, a processing speed of 5000 rpm has been found to provide sufficient shear.

Preferred processing temperatures range from about 80° C. to about 120° C. with processing times ranging from about 3 seconds to about 15 minutes or longer with times of from about 10 seconds to about 2 minutes being preferred. Processing times are longer at lower temperatures, with treatment at 80° C. requiring as much as 15 minutes while processing times at temperatures between 90° C. and 95° C. being about five minutes. By contrast, at 120° C. the processing time may be only about 3 seconds. High processing temperatures are complemented by increased rates of heat transfer. Where the nature of the processing equipment permits, therefore, processing at high heat transfer- rates/high denaturation temperatures for very short times is preferred. It should be noted, however, that at temperatures higher than 120° C. with correspondingly reduced product residence times, the resulting macrocolloid product is "thinner" and may be less desirable.

Processes for the production of the macrocolloids of the present invention utilize an aqueous protein solution characterized by having a protein concentration between about 10% by weight and 20% by weight with protein concentrations between about 15% by weight and 18% by weight being preferred. At protein concentrations less than about 10% by weight, stringy masses tend to form which have undesirable organoleptic qualities. Solutions having protein concentrations much in excess of about 20% by weight tend to become extremely viscous rendering impractical the application of requisite rates of shear to the protein solutions.

The aqueous protein solutions may further comprise up to 100% by weight or more of a polyhydroxy compound, preferably a mono- or di-saccharide. These compounds may be "naturally" present in the protein starting materials (e.g., lactose present in sweet dairy whey protein concentrates) or added to the solutions prior to denaturation processing. Preferred polyhydroxy compounds include reducing sugars such as lactose, glucose, fructose and maltose, with lactose being particularly preferred. Suitable non-reducing sugars include sucrose and lactitol.

The high level of shear useful in the preparative processing of the present invention is believed to prevent the formation of large denatured protein aggregates during denaturation. Aggregate blocking agents may optionally be added to the aqueous solutions to facilitate production of desired products. The aggregate blocking agent be selected or adjusted in concentration so that it does not in turn alter the pH of the mixture to outside of the optimal processing specifications. Suitable aggregate blocking agents include hydrated anionic materials such as xanthan gum (ordinarily included at 0.1% to 1.0% by weight of protein concentrate), datem esters (0.5% to 2.0% by weight of the protein concentrate despite the fact that datem esters tend to contribute an off-flavor to the final product) and lecithin (1% to 10% by weight of the protein concentrate). Other suitable aggregate blocking agents include carrageenan, alginate and calcium steroyl lactylate.

Malto-dextrins produced by enzymatic or acid hydrolysis of starch provide another chemical aggregate blocking agent useful in practice of the invention. The preferred concentration is from 10% to 50% by weight of the protein concentrate. These materials are believed to have a protein-sparing effect, as does high fructose syrup, although the latter is not as efficient as the former in this regard. It will be appreciated that these blocking agents are carbohydrates and hence are a source of calories, a factor which may mitigate against their selection for use in applications such as reduced calorie foods.

Hydrated lecithin and hydrated xanthan gum exemplify the differing effects of different blocking agents. Both impart lubricity to the mouth feel of the final product. Lecithin, however, being a slightly less effective blocking agent, produces a slightly larger average size macrocolloid particle. Those macrocolloid particles produced with xanthan aggregate blocking agent, however, are smaller and smoother particles. Both of the foregoing have a whitening effect on the final product in that they seem to assist in creating a more uniformly dispersed system thereby increasing the light scattering effect which is perceived as whiteness.

Combinations of aggregate blocking agents also have been found to have useful attributes. A lecithin-maltrin combination, for example, is particularly suitable for producing macrocolloids useful in low viscosity salad dressings (e.g., French) and with a more reduced solids content, a coffee whitener. A combination of xanthan and lecithin aggregate blocking agents is preferred for applications such as the high viscosity salad dressings (e.g., Blue Cheese or Creamy Italian), fruit puddings and confectionery gels.

Other optional ingredients such as salts and end product components including suitable flavors, colors and stabilizers may generally be present in or added to the solution without adverse effect. In many cases (i.e., where the nature of the additive and its influence on the protein solution permits), it may be particularly desirable to include such end product components in the protein solution in order to avoid the need for subsequent, additional pasteurization steps following processing.

Protein starting materials may optionally be treated to remove cholesterol, fat and other impurities which may introduce off-tastes to the macrocolloid product. One such procedure comprises an extraction step wherein the protein material is contacted with a food-grade solvent which is preferably ethanol in the presence of a suitable food-grade acid. The protein material is then subjected to several wash and filtration steps to render the extracted protein product.

Suitable solvents include lower alkanols, hexane or the like, with ethanol being particularly preferred. Suitable food-grade acids include mineral acids such as phosphoric, and food grade organic acids such as acetic, citric, lactic, and malic with citric acid being particularly preferred.

The extraction procedure is particularly useful for the removal of cholesterol and fat from protein sources such as whey protein concentrate. In preferred extraction procedures providing optimal elimination of fat and cholesterol, the whey protein concentrate is extracted at 52° C. for six hours with a mixture of 90-97% alcohol (preferably about 90% ethanol), 3-10% water (preferably about 9%) and about 0.01-0.20% acid (preferably about 0.084% citric acid). In alternative practices providing highly desirable flavor and processing characteristics, the whey protein concentrate is extracted at 40° C. for four hours with a mixture of ethanol, water and citric acid with respective concentrations of 94.95, 5.0 and 0.05 percent. According to such procedures, whey protein concentrate comprising as much as 4.0% fat and 0.15% cholesterol prior to the extraction step comprised less than 2% fat and less than 0.02% cholesterol after such an extraction step.

Once the heat denaturation process is completed, the product may, optionally, be subjected to a homogenization treatment. Such a treatment is desirable in the case of products which are dilute (i.e., having a lower protein concentration) and/or neutralized, such as coffee whiteners for example. This treatment is useful in disrupting the relatively loose, inter-particle associations which occasionally form during processing. While not aggregated, (i.e., not fused into particles of substantially larger than 2 microns in diameter) those of the macrocolloids which are associated with one another (i.e., usually in doublets or triplets) are nonetheless organoleptically perceived as single composite particles which cannot be differentiated from aggregates on the basis of their respective mouth feels. The homogenization treatment divides these associations of particles into individual macrocolloidal particles having the desired mouth feel attributes. The homogenization treatment of dilute products having low macrocolloid concentrations (e.g., coffee whiteners) is preferably carried out at about a pH of 6 to 7. At such pHs, the distribution of electrical charges on the surfaces of the macrocolloids helps maintain an even dispersion of the macrocolloids in the aqueous medium. While any of the traditional homogenization treatments known in the art may be employed to this end, reasonable care must be taken to avoid exposing the macrocolloidal particles to such elevated temperatures as may cause them to aggregate to larger particles.

Particle size testing provides a measure of organoleptic quality of the products of the present invention. One of the simplest and most rapid of the techniques involves the preparation of an optical slide in a manner which is analogous to the preparation of clinical blood smears. Pursuant to this method, ten (10) grams of a paste-like food sample is weighed into a Waring blender and 190 grams of distilled water is added to make a 5% solution. The solution is then blended at high speed for 2 minutes and then pH-adjusted to 6.75-7.0. The sample is then subjected to high speed magnetic stirring during sonication for 1 minute using a probe sonicator (Braunsonic Model 2000 Sonicator, Burlingame, Calif.). This procedure breaks up any weak associations that might exist between the individual macrocolloid particles. The solution is then diluted further with deionized water to between 0.25% and 0.50% depending on particle concentration. This solution is then placed in an ultrasonic bath (Branson 2200 Ultrasonic Bath, Shelton, Conn.) for 1 minute immediately before slide preparation.

After shaking by hand for 10 seconds, 20 $\mu$l of the sample, as prepared above, is placed on the center of a microscope slide which has been placed in a Corning slide spinner. The slide is spun immediately after the sample has been placed on the slide. As soon as the slide is dry, usually within about 30 seconds, it is ready for microscopic evaluation.

The sample is observed with a Zeiss Axiomat Microscope equipped with a halogen light source (Zeiss, Thornwood, N.Y.) and a Dage MTI video camera (Michigan City, Ind.) and camera control using a 50× objective and a total magnification ranging between 1000 and 1600. The system is only capable of performing quantitative analysis on particles with diameters greater than about 0.25 microns. For this reason, all statistical measures of particle size herein, unless otherwise noted, refer to particles having major dimensions exceeding 0.25 microns. Nevertheless, particles between about 0.10 microns and about 0.25 microns may be viewed by an observer and their presence is routinely noted. Numerous fields (15 to 25) are scanned to subjectively evaluate the overall size and shape homogeneity/heterogeneity of the sample. Subsequent to qualitative evaluation of the sample, a field is chosen which appears to be representative of the entire sample. This image is then projected on a high resolution black and white television monitor (Lenco, Jackson, Mo.) for quantitative analysis.

The image on the television monitor is first digitized and is then translated from the television monitor to the computer monitor. During this digitization/translation step, the image is slightly reduced with the side effect that some of the particles that were separate on the original image become fused together and are thus not representative of the true particles. These apparently fused particles are then carefully edited out by comparing the old (television monitor) image to the new (computer monitor) image.

Approximately 250±50 particles are typically measured in one field. Initially the number of particles in the image is determined along with their corresponding lengths and breadths. From this data, two additional variables, equivalent spherical (E.S.) diameter and volume, are calculated as follows:

E.S. Diameter = $(B^2 \times L)^{1/3}$
E.S. Volume = $4/3 \pi B^2 L$.

Where B equals breadth and L equals length.

Whyen E.S. Diameter and Volume have been determined for the entire distribution of particles in the image, number-weighted ($D_n$) and volume weighted ($D_v$) means E.S. diameters are calculated. $D_n$ is a number averaged particle size diameter which is calculated by summing the diameter of all particles in the distribution and dividing by the total number of particles. The $D_v$ (volume weighted mean diameter) weights each particle in relation to its volume and thus provides an indication of where the means diameter lies on the basis of volume or implicitly of mass. Maximum Diameter ($D_{max}$) is simple the diameter of the largest particle present in the microscopic field.

This data can be plotted in the form of a histogram plot E.S. diameter on the abcissa as a function of the number of particles as well as volume of particles. From these data, the percentage of particle volume over 2 microns as well as the maximum particle size diameter can also be directly determined.

Apparatus suitable for us in preparation of products of the invention is described in the above-identified U.S. application Ser. No. 606,978. Alternative apparatus is depicted in the accompanying drawing FIGS. 1 through 5.

With reference first to FIG. 1a, a presently preferred processor comprises a housing 10, which in this example is supported by a base plate 11 and secured to it by a plurality of bolts 13. The base plate 11 in turn is mounted on a stand 14 which as an annular rim 16 formed on its upper end. An annular recess 17 in the underside of the base plate 11 receives the rim 16. The stand 14 and the base plate 11 have aligned vertically extending passages 18 and 19 through them, and a vertically extending drive shaft 20 extends through the passage 18 and upwardly into the passage 19. The drive shaft 20 is connected to be rotated by a drive mechanism such as an electric motor (not illustrated) during operation of the processor. Secured to the upper end of the drive shaft 20 is a blade shaft 21, and a key coupling is provided between the two shafts 20 and 21.

The housing 10 of the processor comprises a lower vessel part 26 and an upper lid part 27, the vessel being supported on an annular bearing support 28. The annular bearing support 28 has threaded holes formed in its underside and the previously mentioned bolts 13 are threaded into the holes in order to rigidly secure the seal support 28 to the base plate 11. A centrally located, vertically extending opening 29 is formed through the seal support 28. The upper end portion of passage 29 is widened and it forms a ledge or seat 33 formed on the inner periphery of the passage 29 in order to properly align the seal 39 in the support 28. The blade shaft 21 extends through passage 29. Above the seal 39, a blade 36 (see also FIG. 1b) is positioned on the upper end of the blade shaft 21 and secured thereto by a cap nut 37. The conventional lip seal 39 is provided between the bearing 31, the blade shaft 21 and the washer 38 in order to form a fluid-tight seal at this juncture.

The vessel 26 is in this instance double-walled and includes an outer wall 41 and an inner wall 42, the two walls being spaced in order to form a flow passage 43 between them. The two walls 41 and 42 are bowl-shaped and at their lower center portions have aligned openings 44 formed through them which receive the seal support 28, the two walls 41 and 42 being secured to the seal support 28 such as by welding. At their upper ends, the two walls 41 and 42 are flared radially outwardly from the axis of the blade shaft 21 and are pressed tightly together to form a sealed connection in the area indicated by the reference numeral 46. A heat exchange medium is passed through the space 43 between the two walls, an inlet tube 47 and an outlet tube 48 being secured to the outer wall 41 and connected to the space 43 in order to flow the heat exchange medium through space 43.

The lid 27 extends across the upper side of the two walls 41 and 42 and overlies the upper sides of the flared portions 46. To secure the lid 27 tightly to the vessel 26, a ring 51 is positioned on the underside of the flared portions 46 and the periphery of the circular lid 27 extends across the upper side of the flared portion 46. A circular clamp 52 encircles the outer peripheries of the ring 51 and the lid 27, the clamp 52, the ring 51 and the lid 27 having mating bevelled surfaces 53 so that the clamp 52 wedges or cams the lid 27 tightly downwardly toward the member 52 when the parts are assembled. A gasket or annular seal 54 is mounted between the adjacent surfaces of the ring 51 and the lid 27 in order to seal the connection.

Formed within the housing 26 is a toroidal or donut shaped cavity 61 which is formed between the inner wall 42 of the housing 26 and the lid 27. The interior wall surface 63 of the vessel is in the shape of a round bowl and forms the lower half of the toroidal cavity. The upper half of the toroidal cavity is formed by an annular concave recess 64 formed in the underside of the lid 27 above the wall 63, the annular recess 64 being coaxial with the axis of rotation of the blade 36 and with the center of curved surface 63 of the vessel 26. At the outer periphery of the cavity 61, the interior surface of the recess 64 extends downwardly in the area indicated by the numeral 66 and is closely adjacent the upper edge surface 67 of the ends of the blade 36. In addition, the lid 27 dips downwardly along the axis of the toroidal cavity 61 to form a center portion 68, and the center of the blade 36 and the cap nut 37 slope up at the center of the toroid, directly under the portion 68.

The lid 27 has two holes or passages 71 and 72 formed in it. The passage 71 is on the axis of the cavity 61 and extends from the upper surface of the lid 27 and through the portion 68 and opens on the axis of the cavity 61. A tube 73 is fastened to the upper end of the passage 71 by a threaded fitting 74, and a pressure control device 76, which in the present instance is a weight, is positioned on the upper end of the tube 73. A dead-end hole 77 is formed in the weight 76 and the upper end of the tube 73 extends into the hole 77. During the operation of the processor, internal pressure within the cavity 61 may be vented out of the cavity through the tube 73 if the pressure is above the amount required to lift the weight 76 off of the upper end of the tube 73, and the weight 76 thereby maintains pressure within the cavity. The passage 72 is connected to another tube 78 by a fitting 79, and the passage 72 extends to the uppermost portion of the cavity 61. The passage 72 and the tube 78 may be used, for example, for venting air from the cavity 61 when it is filled with a fluid to be processed, and a thermocouple (not shown) may be inserted through the tube 78 and the passage 72 and into the upper surface of the fluid during the processing in order to monitor the temperature of the fluid.

The blade 36 includes a central thickened portion 81 which has a vertically extending hole 82 formed through it for the blade shaft 21. The cap nut 37 fits across the upper surface of the portion 81. Extending radially outwardly from the portion 81 are two arms 83 and 84 which curve radially outwardly and upwardly and extend closely adjacent (a clearance of about 0.5 to 1.0 mm is preferred) the interior curved surface 63 of the wall 42 of the vessel. The upper end portions of the blade arms 83 and 84 are substantially parallel with the blade axis, and thus the arms extend over the lower half of the toroidal cavity. As shown in FIG. 1*b*, the sides 86 and 87 of the two arms 83 and 84 also taper such that the blade arms narrow adjacent their outer ends. Assuming that the blade 36 and the shaft 21 rotate in the counterclockwise direction as seen in FIG. 1*b*, the two arms 83 and 84 have leading sides 86 and trailing sides 87. With reference to FIG. 4, the two edges 86 and 87 of each arm are relatively blunt but preferably taper downwardly and toward each other.

Considering the operation of the processor illustrated in FIG. 1*a*, assume that the composite shaft 20, 21 is coupled to be rotated by a suitable drive motor and that the lid 27 is initially removed from the vessel 26. The cavity 61 is filled with a batch of fluid which is substantially equal in volume to the volume of the cavity 61 with the lid on the vessel. With this batch of fluid in the vessel portion of the cavity, the lid 27 is positioned over the vessel with the annular portion 66 of the lid extending downwardly into the vessel cavity. The clamp 52 is then attached to the adjoining outer peripheral parts of the vessel and the lid, in order to tightly secure the lid to the vessel. As the lid 27 is moved downwardly onto the vessel, air in the upper portion of the concave recess 64 may escape through the passage 72, along with any excess amount of the fluid within the cavity 61. Elimination of the air from the cavity may be assisted by slowly turning the composite drive shaft 20, 21 and the blade 36 in order to eliminate any air pockets in the fluid and remove any air from the cavity. In this manner, air is eliminated from the cavity 61 prior to processing.

To process the fluid, the composite shaft 20, 21 and the blade 36 are rapidly rotated, and the high speed rotation of the arms 83 and 84 creates high shear forces within the fluid. Subsonic pulses are formed at the leading edges 86 of the arms and cavitation occurs at the trailing edges 87. The rapid rotation of the arms causes the fluid to assume the shape of a natural toroid 91 or donut as illustrated in FIG. 5. By a natural toroid, it is meant that the fluid naturally assumes the toroidal shape in the absence of the lid 27 on the vessel In other words, if the lid 27 were removed and the blade rotated at a sufficient speed, the fluid will assume the shape of the toroid 91. The annular concave recess 64 in the underside of the lid 27 is shaped to conform to the surface of the toroid 91, thereby disallowing presence of "dead zones" wherein fluid flow is much less intense With reference to FIG. 5, it is theorized that the surface fluid of the toroid 91 flows upwardly and radially inwardly from the outer ends of the blade arms, and the fluid circles along the path indicated by the arrows 92. In addition, the fluid moves in the circumferential direction and follows the direction of movement of the blade, thereby forming a helical path. Further, it is theorized that a number of concentric layers are formed in the fluid (the layers being represented by the concentric arrows 93), and the layers follow similar helical paths. There is also, however, movement of the liquid between the layers so that homogeniety is rapidly produced within the fluid. The movement of the blade through the fluid and the movement of the various fluid layers against each other is so intense that there is a high degree of conversion of mechanical energy to heat.

When the blade is rotated at about 5,000 rpm, the blade causes the fluid to undergo the described rapid toroidal flow and significant cavitation and turbulence are created, particularly in front of the leading edges 86. The flow of the fluid permits rapid heat transfer from the wall 42 and the heat exchange medium. The agitation or high shear force produced by the blade quickly mixes and heats the fluid. The conversion of mechanical energy to heat is estimated by measuring the temperature rise in the fluid above the temperature of the heat exchange medium per unit of time and per unit of mass. The intensity of work input to the fluid by rotating blade 36 is sufficiently high (as reflected by the magnitude of temperature rise due solely to mechanical effects) to prevent the aggregation of, e.g., protein molecules, larger than a particle size of about 1 to 2 microns.

The blade 36 is particularly effective in heating and mixing the fluid. The relatively blunt leading edges 86 of the blade at 5,000 rpm produce subsonic pulses in the fluid, whereas cavitation occurs at the trailing edges 87. The slight downward and inward taper of the sides 86 and 87 (shown in FIG. 4) moves the fluid in front of the blade arms toward the bottom of the cavity and against the wall. This action produces great agitation of the fluid and also effectively eliminates accumulation of product on the cavity wall. The blade produces a natural torus and the chamber or cavity is shaped to match the natural torus during mixing, thereby avoiding dead space in the cavity, preventing caking or buildup of the product in low flow spaces, and promoting uniformity of the mix.

In an instance where the fluid in the cavity is to be prevented from becoming too hot, a cooling medium is flowed through the tubes 47 and 48 and the space 43 in order to restrain the fluid in the cavity 61 from rising beyond a desired temperature. On the other hand, if the fluid is to be heated, a hot medium may be flowed through the space 43. After the fluid has been sufficiently agitated by the blade and the temperature of the fluid is at the desired level, the blade rotation is stopped, the lid 27 is removed, and the batch of the mixed fluid is removed from the cavity 61.

FIGS. 2 and 3 illustrate a preferred embodiment of the apparatus which is designed for a continuous flow operation as contrasted with the batch operation of the embodiment shown in FIG. 1a. The embodiments of FIG. 1a and FIG. 2 include corresponding parts and the same reference numerals are used in the two figures for corresponding parts, except that the numerical value of 100 is added to the numerals in FIGS. 2 and 3.

With specific reference to FIG. 2, the processor includes a vessel 126 and a lid 127 which are similar to those of FIG. 1a except that the lid 127 has a larger vertical thickness. The vessel and the lid in FIG. 2 are fastened together by a clamp 152 with seal 154 and O-ring 155 located between them. The vessel and the lid form a toroidal cavity 161 between them and a blade 136 is mounted within the cavity 161. In this specific example, the vessel 126 also has double walls similar to the vessel of FIG. 1a and inlet and outlet tubes 147 and 148 are also provided. However, the tubes 147 and 148 are sealed by plugs 201 in order to form a dead air space 143 between the two walls, this space acting as insulation around the vessel. The lid 127 has the passage 172 formed in it which may be used for a thermocouple sensor, and the passage 171 which, in this instance, forms an outlet for the continuous flow of the fluid product after processing as it leaves the cavity 161.

The vessel 126 is mounted on the base plate 111 by a base 128 which in this embodiment of the invention also includes a passage for the flow of the fluid into the processor cavity. A product inlet tube 203 is connected to a source (not shown) of the fluid product and to an annular seal ring 204 which fits tightly around the outer periphery of the base 128. The inner end of the tube 203 connects with a diagonal passage 206 in the base 128, which is sealed at its outer end by an O-ring 207. The passage 206 angles radially inwardly and upwardly as seen in FIG. 2 to the interior surface of the base 128 and to a spacer busing 208. A circular recess or groove 209 is formed in the outer surface of the bushing 208 and the passage 206 is in flow communication with the groove 209. Consequently, product flowing into the processor through the tube 203 flows through the passage 206 and into the annular groove 209. A plurality of feed or inlet ports 211 angle upwardly and radially inwardly from the groove 209 and the upper ends of the ports 211 appear on the upper surface of the bushing 208 below the lower surface of the blade 136. Due to the angles of the inlet ports 211, the fluid product entering the cavity first flows radially inwardly and upwardly and then flows radially outwardly and upwardly past the sides of the blade 136.

A mechanical seal 216 is provided to seal the connection between the spacer bushing 208 and the blade 136. The mechanical seal 216 is annular and is sealed to 208 by O-rings 217, 217b and an upwardly projecting seal face 218 on the upper end of the seal 216 engages the underside of the blade 136. With reference to FIG. 1b, the seal face 218 is shown in dashed lines and it will be noted that it is entirely within the outer contour of the blade. To obtain a good seal, the underside of the blade 136 in the area of the seal face 218 is preferably lap ground. Another rotary lip seal 221 is provided between the base 128 and the shaft 121 in order to seal this connection. The seal 221 is nonrotatably mounted at its outer periphery on the base 128 and its inner periphery slidingly engages the outer surface of the shaft 121. An annular spring 222 such as a garter spring holds the lip seal tightly against the shaft 121.

A chamber 223 is thus formed between the lip seal 221, the mechanical seal 216, the outer surface of the shaft 121 and the bushing 208. This chamber 223 is flushed by cooling water which enters the processor through a tube 226 and leaves the processor through another tube 227, the two tubes being located at opposite sides of the processor as shown in FIG. 3. The two tubes 226 and 227 are also mounted on the seal ring 204 and extend radially through the ring 204. Flow passages 228 and 229 are formed through the base 128, the inner ends of the two passages connecting with opposite sides of the chamber 223. The outer ends of the passages 228 and 229 respectively connect with the tubes 226 and 227, and O-rings are provided around these connections. Consequently, during operation of the processor, coolant water flows into the processor through the tube 226, into the chamber 223 and around the internal surfaces in the area where the mechanical seal 216 meets the lower surface of the blade 136, and then out of the chamber through the tube 227.

During the operation of the processor, the lid 127 is fastened to the vessel 126, the blade 136 is rotated within the cavity 161, and the coolant water is flowed through the chamber 223. The product mix is then introduced into the cavity 161 by being flowed through the inlet tube 203, through the passage 206 and the inlet ports 211, and into the cavity 161 from the underside of the rotating blade 136. The fluid product fills the cavity 161 and air initially filling the cavity is flushed by fluid flow through the tubes 172. The fluid assumes its natural toroidal shape within the cavity 161 as previously described and the walls of the vessel 126 and the lid 127 conform to the shape of the natural toroid. The product within the cavity is held under pressure because pressure is required in the tube 203 in order to force the fluid product through the cavity and out of the passage 171. The outlet tube 231 connected to the passage 171 may contain a restriction or valve in order to form a back pressure and thereby increase the pressure within the cavity 161.

The described mixing and heating of the fluid in the cavity 161 is similar to that in the cavity 61. The fluid entering the cavity flows directly into a high shear area below the blade. Further, the upward and inward angle of the ports 211 causes the incoming fluid to form a turbulent flow and wash against the seal 216, and thereby prevent any buildup or caking of the fluid in this area. Further, the inward flow and proximity to the center ensures that all of the fluid flows under the blade and that some of the fluid will not be shunted out at the sides of the arms immediately after leaving the ports 211. The coolant flow within the chamber 223 prevents the bearing 216 and the blade from overheating and burning the fluid product being processed. The port 211 opposite inlet 206 is preferably slightly enlarged to provide uniform flow through the three ports.

According to a procedure for operating the apparatus of FIG. 1a, the empty vessel is aligned, the shaft segments are mated, the vessel is secured to the base plate and the blade is mounted on the shaft and secured. Three hundred forty (340) grams of deaerated protein premix is charged into the vessel, care being taken to avoid the formation of bubbles or voids.

The lid is fitted into the well formed by the upper walls of the vessel and is slid down into place over the gasket with care being taken to position the empty thermocouple-port so that entrapped air can be vented through this port. Removal of any trapped air may be facilitated by slowly rotating the blade. When this has been accomplished, the lid is seated securely, excess premix which may have been forced out of the port is removed, and the thermocouple is inserted and secured. The lid is then secured by clamping means and the counter-weight is seated on the vent-tube.

Heating fluid is then circulated through the vessel, the drive means is switched on; and the speed of the blade is set at the desired rotational speed, which is typically greater than about 5000 rpm. The blade rotating at this speed causes the contained protein premix to undergo rapid toroidal flow with the consequence that significant cavitation and turbulence are created, particularly in the areas immediately in front of the impact-edges of the blade). The swirling flow of the premix is adequate to permit rapid heat-transfer from the heating fluid through the inner vessel wall, into the premix. As the temperature of the premix passes through about 80° C., the viscosity of the mix begins to increase but the blade is maintained at a constant speed by the motor.

The unabated high work-input (coupled with the increasing viscosity) imparts considerable mechanically-induced heat to the product. Typically, this drives the product temperature about 20° to 40° C. above the temperature of the "heating" fluid in a period of from about one to two minutes. When the targeted temperature and dwell-time have been achieved, the externally-mounted valves which control the flow of heat-exchange fluids are aligned so that the heating fluid is displaced by cooling fluid. Product temperature is seen to begin to decrease immediately. When the product is cooled to 80° C., the blade speed is reduced to about 1000 rpm in order to avoid imparting further mechanical energy and thus to reduce cooling time. When the product has been cooled to about 35° C., the drive means is turned off, the lid is removed, and the product is collected from the vessel and the lid.

The following examples relate to preferred methods and procedures according to the present invention. Example 1 relates to a preferred method for the production of macrocolloid material according to the invention from the extracted whey materials. Example 2 relates to the production of macrocolloid material from bovine serum albumin. Example 3 relates to the production of macrocolloid material from egg white albumin while Example 4 relates to the use of soy protein to form macrocolloid materials according to the invention.

EXAMPLE 1

An extraction procedure was carried out for the removal of fat and cholesterol from the whey protein concentrate (WPC) protein source prior to denaturation processing. More specifically, a reactor was charged with 181 kg of absolute ethanol (Lot Nos. 16468x, 16995x, Aaper Alcohol & Chemical Co., Shelbyville, Ky.). Water (8.58 kg) and 10% citric acid solution (954 grams, Miles, Elkhart, Ind.) were then added and the solution was agitated for about two minutes. The pH of the solution was then measured to confirm that it was pH 5.0±0.5.

One hundred and forty pounds (63.5 kg) of whey protein concentrate WPC-50 (lot 6302-2 Fieldgate, Litchfield, Mich.) was then added to the reactor and the reactor was sealed. Steam was then admitted to the reactor jacket and the reactor temperature was maintained at 40°–42° C. for 4 hours. The protein slurry was removed from the reactor and filtered on a continuous belt filter allowing the cake thickness to reach 1 inch. The collected cake weighed 116 kg. The reactor was charged with 127 kg of 95% ethanol and the wet cake was added to the reactor to form a slurry which was mixed for 20 minutes. The slurry was then removed, filtered as before, and the collected cake was again added to the reactor charged with 127 kg of 95% ethanol. The slurry was mixed for 20 minutes and was then filtered with care taken to remove as much liquid as possible. The wet cake weighed 104.5 kg.

The wet cake was then placed in trays to a uniform depth of 1 inch or less. The material was then dried under vacuum for 12 hours at temperature of 45°±1° C., providing 51.5 kg of WPC material for a yield of 80.9%. Calculating that approximately 3.5 kg of material had been lost in the dryer, the percentage of volatiles in the initial wet cake was calculated to be 47.4%.

The resulting material had a protein concentration of 56.91% and a solubility of 93% measured according to the solubility determination method described above. The protein was then employed to make up a formulation which included lecithin ("Lecigran F", Riceland, Little Rock, Ark.), 37% Food Grade hydrochloric acid (J. T. Baker, Phillipsburg, N.J.), xanthan ("Keltrol T", Kelco, San Diego, Calif.) and water.

TABLE 2

| Whey Protein Formulation | | |
|---|---|---|
| Ingredient | % | Wt. (g) |
| WPC-50 | 34.500 | 690.00 |
| Lecithin | 0.932 | 18.64 |
| Hydrochloric Acid | 1.590 | 31.80 |
| Xanthan | 0.186 | 3.72 |
| Water | 62.792 | 1255.00 |
| | 100.000 | 2000.00 |

The components of the formulation listed in Table 2 above were added to a high shear mixer and deaerator (Kady Mill, Scarborough, Me.) in the following order: water, hydrochloric acid, lecithin, xanthan and whey protein concentrate. The mixture was deaerated before being introduced into the apparatus of FIG. 1, with care taken to minimize the conversion of mechanical energy to heat. The processing vessel was then filled with the premix which had a pH of 4.15, sealed and the temperature recorder was turned on. The motor was activated, and the speed of the blade was adjusted to 5,080 rpm. After a few seconds, heating fluid with a temperature of 100° C. was circulated through the jacket of the vessel. The product reached a temperature of 122° C. in 4.3 minutes, at which time the heating fluid was displaced by a flow of cold water which cooled the product to 40° C. within 2 minutes.

The product obtained from the above process was then evaluated for its organoleptic and physical characteristics. The product, which may be seen at 1000x in FIG. 2, had a smooth and creamy consistency with 64% of the protein converted to macrocolloid particles with 0% of the produced particles having dimensions exceeding 3 microns. The spherical particles had a volume-weighted mean diameter ($D_v$) of 0.99 microns, a mean particle size diameter ($D_n$) of 0.78 microns and a maximum diameter ($D_{max}$) of 1.50 microns.

EXAMPLE 2

In this example, bovine serum albumin (BSA) was used to produce a protein macrocolloid product according to the invention. Bovine serum albumin identified as "Bovine Albumin, Fraction V" was obtained from U.S. Biochemical Corp. (Cleveland, Ohio). The material was a lyophilized powder with a 97% protein content and a solubility of 99% according to the solubility determination method described above. Other formulation ingredients included lecithin ("Lecigran F", Riceland, Little Rock, Ark.), 37% Food Grade hydrochloric acid (J. T. Baker, Phillipsburg, N.J.), Xanthan ("Keltrol T", Kelco, San Diego, Calif.), lactose (alpha-lactose monohydrate, Sigma St. Louis, Mo.) and water.

TABLE 3

| Bovine Serum Albumin Formulation | | |
|---|---|---|
| Ingredient | % | Wt. (g) |
| BSA | 13.080 | 121.64 |
| Lecithin | 2.100 | 19.53 |
| Hydrochloric Acid | 0.770 | 7.16 |
| Xanthan | 0.200 | 1.86 |
| Lactose | 7.560 | 70.31 |
| Water | 76.290 | 709.50 |
| | 100.000 | 930.00 |

The formulation listed in Table 3 above was prepared in a high shear mixer and deaerator (Kady Mill, Scarborough, Me.) with the xanthan gum having been prehydrated. In order, water, hydrochloric acid, lecithin, xanthan, lactose and BSA were added to the mixer and the mix was deaerated before being introduced into the apparatus of FIG. 1. The processing vessel was filled with the premix which had a pH of 4.19, sealed and the temperature recorder was turned on. The motor was activated, and the speed of the blade was adjusted to 5,080 rpm. After a few seconds, heating fluid with a temperature of 80° C. was circulated through the jacket of the vessel.

The product reached a temperature of 126° C. in 4.8 minutes, at which time the heating fluid was displaced by a flow of cold water. The product was cooled to 40° C. within 2 minutes. The shear rate of this processor is reflected in the 46° C. difference between the temperature of the product and the temperature of the heating fluid. This additional heat had been derived from the conversion of mechanical energy to heat at the rate of about 380 J/sec.

The product obtained from the above process was then evaluated for its organoleptic and physical characteristics. The product had a thick consistency similar to the macrocolloid material produced from whey protein concentrate, and a creamy texture with high lubricity. 71% of the protein had been converted to macrocolloidal particles. The particles were dominantly spheroidal although some rod-like and fibrous particles persisted, as may be seen in FIG. 4. These rods and fibers having dimensions exceeding 3 microns accounted for 2.25% of the particles by number. When the rods and fibres were excluded from the microscopy-image analysis, the spheroidal particles had a volume-weighted mean diameter ($D_v$) of 1.03 microns, a mean particle size diameter ($D_n$) of 0.66 microns and a maximum diameter (Dmax) of 1.75 microns.

EXAMPLE 3

In this example, egg white albumin was used to produce a protein macrocolloid product according to the invention. It was determined that a combination of fresh egg white and spray dried egg white would produce the desired product. Fresh egg white was separated manually on the day the premix was prepared from fresh eggs purchased locally. This egg white was determined to include 98% soluble protein but the protein concentration was less than 10%. Due to the initial protein concentration, processing of fresh egg white alone, can give rise to stringy masses of denatured protein product. Spray dried egg white was obtained from Henningsen Foods (White Plains, N.Y.) (Type P-110 egg white solids) with 80% minimum protein. The protein solubility of the spray dried egg white powder was only 83% and processing of this material alone can generate an unacceptable number of oversize particles. In order to avoid the limitations of using each of the materials alone, the fresh and spray dried egg white materials were combined to provide a suitable egg albumin protein source for practice of the invention.

Lecithin, xanthan, hydrochloric acid and lactose were obtained from the sources cited in Example 1 and were utilized in the amounts listed in Table 4 below.

TABLE 4

| Egg White Albumin Formulation | | |
|---|---|---|
| Ingredient | % | Wt. (g) |
| Fresh Egg white | 70.21 | 1168.92 |
| Spray Dried Egg White | 13.44 | 223.72 |
| Lecithin | 2.97 | 49.54 |
| Xanthan | 0.30 | 4.95 |
| Hydrochloric Acid | 2.37 | 39.43 |
| Lactose | 10.71 | 178.35 |
| | 100.00 | 1664.91 |

Fresh egg white, lecithin, xanthan, lactose, spray dried egg white and hydrochloric acid were added in sequence and in the amounts specified in Table 4 to a high shear mixer where they were mixed and deaerated. The resulting premix had a pH of 3.6 and was introduced into the processing apparatus of FIG. 1. The processing was carried out with a bath temperature of 80° C. and was continued for 4.33 minutes with the blade speed set at 5,080 rpm. The maximum product temperature was 125° C.

The product obtained from the above procedure was thick and creamy. 88.9% of the protein had been converted to macrocolloidal particles which had a pronounced tendency to loosely aggregate. Particle size analysis showed that the particles were within the desired size range with a $D_v = 1.22$ microns and with 4% of the particles over 2 microns. Substantially all particles were spheroidal as may be seen in FIG. 4.

EXAMPLE 4

In this example, soy protein was used to produce a protein macrocolloid product according to the invention. Soy protein was obtained from Ralston Purina (SN 1631-32-1, St. Louis, Mo.) which had a protein content of 61.4% and a solubility of 81% according to the method cited above. Lecithin, xanthan, hydrochloric acid and lactose were obtained from the sources cited in Example 1 and were utilized in the amounts listed in Table 5 below.

TABLE 5

| Soy Protein Formulation | | |
|---|---|---|
| Ingredient | % | Wt. (g) |
| Soy Protein | 22.036 | 99.16 |
| Lecithin | 3.000 | 13.50 |
| Xanthan | 0.100 | 0.45 |
| Hydrochloric Acid | 2.196 | 9.88 |
| Lactose | 10.800 | 48.60 |
| Water | 61.868 | 278.41 |
| | 100.000 | 450.00 |

The mix was prepared by adding water, hydrochloric acid, lecithin, xanthan, lactose and soy protein in sequence to a high shear mixer where they were mixed and deaerated. The resulting premix had a pH of 3.74 and was introduced into the processing apparatus of FIG. 1. The bath temperature was kept at 110° C. Heating was continued for 4.30 minutes with the speed set at 5,080 rpm. The maximum temperature reached by the product was 119° C.

The product developed a light tan color during cooking and was smooth, creamy, and thick with a somewhat beany taste typical of soy products. 71% of the protein was converted to macrocolloidal particles. Particle size analysis showed that the particles were within the desired size range, with a $D_v$ of 1.46 microns and a $D_{max}$ of 2.5 microns. Substantially all particles were spheroidal as may be seen in FIG. 5.

The foregoing illustrative examples are believed to provide an ample demonstration of the generic nature of the discoveries constituting the present invention. In one of its broadest aspects, the invention resides in the discovery that virtually any source of animal or vegetable protein can be employed to generate proteinaceous water-dispersible macrocolloid particles which in hydrated form possess the substantially smooth (i.e., non-powdery, chalky or gritty) organoleptic character of an oil-in-water emulsion. In general, hydrated macrocolloid products of the invention have relatively high viscosities (on the order of 25,000 cps), are non-dilatant, and possess the lubricity (i.e., absence of adhesiveness)

of fat emulsions. Such products are conspicuously useful as partial or total replacements for fats and fat-like materials in a wide variety of foods wherein fats ordinarily are present in amounts sufficient to make an organoleptic contribution.

The proteinaceous products of the invention are rather readily prepared through controlled denaturation processing of previously substantially undenatured proteins to provide a relatively homogeneously sized and shaped population of hydrated protein particles wherein the particle size distribution is effective to impart the substantially smooth organoleptic character ordinarily only provided by oil-in-water type fat emulsions.

As demonstrated in the illustrative example, the controlled denaturation processing required to generate the desired populations of proteinaceous particles is most is most readily provided by concurrent application of heat and high shear forces to solutions of protein. In order to optimally attain the benefits of the invention, the starting material protein solutions should be formulated from, e.g., dried protein source materials wherein in excess of about 80% of the dry protein is soluble in water or dilute salt solutions. Alternately stated, the use of source materials which comprise substantial amounts of insoluble protein or provide any substantial quantity of insoluble, particulate, non-proteinaceous materials, is unlikely to provide desired products because application of heat and high shear is usually ineffective to reduce particle size of oversized material during processing. Where it is desired to make use of protein preparations containing oversized materials which are not reduced during processing, it is within the contemplation of the invention to pretreat the preparations by known size reduction processes effective to reduce existing particles to within or below the desired size range prior to controlled heat/shear processing. An example of such pretreatment would include processing the preparation in an attrition mill such as is commonly employed in the field of paint and pigment preparation.

The chemical complexity of proteins, the amphoteric character of protein in solution and the general heterogeneity of most natural protein source materials all dictate that the controlled denaturing processes of the invention take into account the pH of the solutions heated and subjected to high shear. At present, optimal results are provided by carrying out heat denaturation at any pH below the midpoint of the isoelectric curve of the proteins in solution, with care being taken to avoid those pH values so low as to give rise to hydrolytic degradataion of the proteins. Consistent with these considerations, many protein solutions will require adjustment of pH (with any suitable food grade acid) prior to denaturation.

The ability to generate desired substantially homogeneously sized and shaped populations of protein particles can, in many instances, be favorably or unfavorably affected by the presence or absence of soluble, non-proteinaceous components in the solutions subjected to denaturation. Among the more significant of these components are the "aggregate blocking agents" previously described. While the term is aptly descriptive of one of the potential functions served by these compounds (i.e., prevention of the formation of aggregation of protein molecules to larger than desired size ranges), they serve other functions such as enhancing the overall lubricity of the macrocolloid products. Significantly, these compounds can also significantly increase the extent of conversion of protein to particulate form, most likely through charge-based effects or protein complex formation. The combination of effects on enhancement of coagulum-formation and prevention of particle formation results in an overall "focusing" of formation of protein particles in the desired size range. In preliminary studies directed toward ascertaining more precisely the effects of aggregate blocking agents, it was observed that upon the addition at room temperature of acidified, substantially pure protein solutions to hydrated aggregate blocking agents, a coagulum appeared which could be dissolved by increasing pH toward neutrality. The coagulum displayed a variety of macroscopic forms including a single massive gel, an abundance of fibers ranging into the microscopic region and/or small globular, disaggregated particles. The configuration of the coagulum can be used to guide the choice of the concentration of added materials and their order of addition.

The selection of one or more aggregate blocking agents for incorporation in protein solutions to be treated by controlled heat denaturation according to the invention can suitably be based on examination of room temperature coagulum-forming effects as noted above. The formation of a large globular coagulum or massive gel upon mixture of an acidified protein solution to the aggregate blocking agent is generally predictive of poor prospects for obtaining a dispersion of particles within the desired size range. Likewise, formation of a fibrous coagulum is predictive of denaturation products having substantial numbers of non-spherical and threadlike protein particles unless positive steps are taken to disperse the coagulum prior to application of heat and high shear conditions. The formation of small, globular, disaggregated coagulum particles at room temperature is correspondingly generally predictive of denaturation processability to provide the desired macrocolloid product.

Other solution components which can play a significant role in processes of the invention are naturally-occurring polyhydroxy compounds such as mono- and di-saccharide sugars, especially lactose. It will be apparent from the illustrative examples that whey protein concentrate solutions which contain on the order of 50 percent by weight lactose are readily subjected to heat and high shear to provide products of the invention. In preliminary studies of the effects of lactose concentrations on the ability to use controlled heat denaturation for large scale production of products, it was found that chromatographic purification pretreatment of whey protein concentrates to remove substantially all lactose did not preclude preparation of useful products. On the other hand, however, adding lactose to the lactose-free whey protein solutions did improve efficiency of production, especially when aggregate blocking agents are employed. Moreover, as indicated in the above illustrative examples, the preparation of macrocolloids of the invention by heat/shear treatment of bovine serum albumin, egg albumin and soy protein was benefited substantially by addition of lactose to the solutions. While reducing sugars such as lactose would appear to be the most suitable additives, non-reducing sugars can also be effectively employed as additives.

Numerous modifications and variations in practice of the invention are expected to occur to those skilled in the art upon consideration of the foregoing descriptions of preferred embodiments thereof. Consequently, only such limitations should be placed upon the scope of the invention as appear in the appended claims.

What is claimed is:

1. A proteinaceous, water-dispersible, macro-colloid comprising substantially non-aggregated particles of denatured protein having in a dry state a mean diameter particle size distribution ranging from about 0.1 microns to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

2. The macrocolloid of claim 1 wherein the protein is derived from undenatured substantially soluble protein.

3. The macrocolloid of claim 1 wherein the protein is bovine serum albumin.

4. The macrocolloid of claim 1 wherein the protein is egg white albumin.

5. The macrocolloid of claim 1 wherein the protein is soy protein.

6. The macrocolloid of claims 1, 2, 3, 4 or 5 wherein said particles are hydrated.

7. An aqueous dispersion of the macrocolloid of claim 1.

8. The dispersion of claim 7 wherein said particles of denatured protein are obtained from an undenatured protein which is substantially soluble.

9. The dispersion of claim 8 wherein said particles of denatured protein are obtained from an undenatured protein which is greater than 90% soluble.

10. The dispersion of claim 7 wherein said particles are produced from an aqueous solution characterized by having a protein concentration between about 10% and about 20%, and a pH less than the midpoint of the isoelectric curve of the protein.

11. The dispersion of claim 10 wherein said aqueous solution has a pH about 1 pH unit below the midpoint of the isoelectric curve of the protein.

12. The dispersion of claim 10 wherein said aqueous solution contains sugar in an amount up to 100 percent by weight of a sugar per unit weight of protein.

13. The dispersion of claim 10 wherein said sugar is lactose.

14. The dispersion of claim 11 wherein said particles are produced from said aqueous solution characterized by having between about 15% and about 18% by weight protein.

15. The dispersion of claim 11 wherein said solution is modified by the addition of one or more aggregate blocking agents.

16. The dispersion of claim 15 wherein said aggregate blocking agent is an anionic blocking agent.

17. The dispersion of claim 16 wherein said anionic aggregate blocking agents are selected from the group consisting of xanthan, datem esters, lecithin, carrageenan, alinate and calcium steroyl lactylate.

18. The dispersion of claim 15 wherein said aggregate blocking agent is a malto-dextrin.

19. A process comprising heating undenatured substantially soluble and coagulable proteins at heat denaturing temperatures in an aqueous solution at a pH less than the isoelectric point of said proteins, under shear conditions selected and carried out for a time sufficient so as to avoid the formation of any substantial amounts of fused particulate proteinaceous aggregates having diameters in excess of about 2 microns while also forming denatured proteinaceous macrocolloidal particles which are greater than about 0.1 microns in diameter.

20. The process according to claim 19 wherein the proteins are selected from the group consisting of bovine serum albumin, egg white albumin and soy protein.

21. The process according to claim 19 wherein said pH is about 1 pH unit below the midpoint of the isoelectric curve of the protein.

22. The process according to claim 19 wherein said heat denaturation is carried out at temperatures of between about 80 degrees Centigrade and about 120 degrees Centigrade.

23. The process according to claim 19 wherein said shear rate is greater than about 7,500 reciprocal seconds.

24. The process according to claim 19 wherein said time is between about 10 second and about 120 seconds.

25. The product of the process according to claim 19.

* * * * *

UNITED STATES PATENT AND TRADEMARK OFFICE
CERTIFICATE OF CORRECTION

PATENT NO. : 4,961,953

DATED : October 9, 1990

INVENTOR(S) : Singer et al

It is certified that error appears in the above-identified patent and that said Letters Patent is hereby corrected as shown below:

On the title page, item [75], where the inventors are named, "Yamamoto Shoji" should read --Shoji Yamamoto--.

Signed and Sealed this

Fourteenth Day of July, 1992

Attest:

DOUGLAS B. COMER

*Attesting Officer*  *Acting Commissioner of Patents and Trademarks*